(12) United States Patent
Nishimura et al.

(10) Patent No.: US 6,497,052 B2
(45) Date of Patent: Dec. 24, 2002

(54) DIAL GAUGE

(75) Inventors: Yasunori Nishimura, Kawasaki (JP); Toru Fujimitsu, Nakatsugawa (JP); Mikio Suzuki, Nakatsugawa (JP); Toshiyuki Shinohara, Nakatsugawa (JP)

(73) Assignee: Mitutoyo Corporation, Kawasaki (JP)

( * ) Notice: Subject to any disclaimer, the term of this patent is extended or adjusted under 35 U.S.C. 154(b) by 33 days.

(21) Appl. No.: 09/803,054

(22) Filed: Mar. 12, 2001

(65) Prior Publication Data

US 2001/0022036 A1 Sep. 20, 2001

(30) Foreign Application Priority Data

Mar. 15, 2000 (JP) .................................. 2000-072141

(51) Int. Cl.[7] .................................................. G01B 3/22
(52) U.S. Cl. ....................................................... 33/832
(58) Field of Search ............................. 33/832, 825, 831, 33/833, 549, 556, 559

(56) References Cited

U.S. PATENT DOCUMENTS

| | | | |
|---|---|---|---|
| 4,420,888 A | | 12/1983 | Wakao et al. |
| 4,489,496 A | * | 12/1984 | Mizuno et al. ............... 33/832 |
| 4,809,440 A | * | 3/1989 | Rutter ......................... 33/828 |
| 5,125,165 A | * | 6/1992 | Gerhard ....................... 33/832 |
| 5,768,798 A | * | 6/1998 | Takahashi et al. ............ 33/832 |
| 5,979,069 A | * | 11/1999 | Hayashida et al. ........... 33/832 |
| 6,164,976 A | * | 12/2000 | Yamashiro et al. ........... 33/832 |
| 6,192,755 B1 | * | 2/2001 | Ishii et al. .................... 33/517 |

FOREIGN PATENT DOCUMENTS

| DE | 33 04 051 A1 | 8/1983 |
|---|---|---|
| DE | 196 12 409 A1 | 10/1997 |
| EP | 0 833 132 A2 | 4/1998 |

* cited by examiner

*Primary Examiner*—Christopher W. Fulton
(74) *Attorney, Agent, or Firm*—Oliff & Berridge, PLC (57) ABSTRACT

A dial gauge (1A) has stem bush (20) having a fitting (21) fitted to an inner wall of a stem (5) and having a predetermined clearance between a spindle (3), a holder (22) for slidably holding the spindle (3) while securing a predetermined clearance against the inner wall of the stem (5), and an elastically deformable connector (23) for connecting the fitting (21) and the holder (22), whereby an influence of deformation of the stem (5) and the fitting (21) on the holder (22) during clamping can be minimized, so that the dial gauge (1A) can be fixed to a supporting stand without deteriorating slidability of the spindle (3).

5 Claims, 8 Drawing Sheets

DIAL GAUGE

BACKGROUND OF THE INVENTION

1. Field of the Invention

The present invention relates to a dial gauge. More specifically it relates to a dial gauge for detecting a displacement of a spindle to measure a dimension of a workpiece.

2. Description of Related Art

Figure 7:
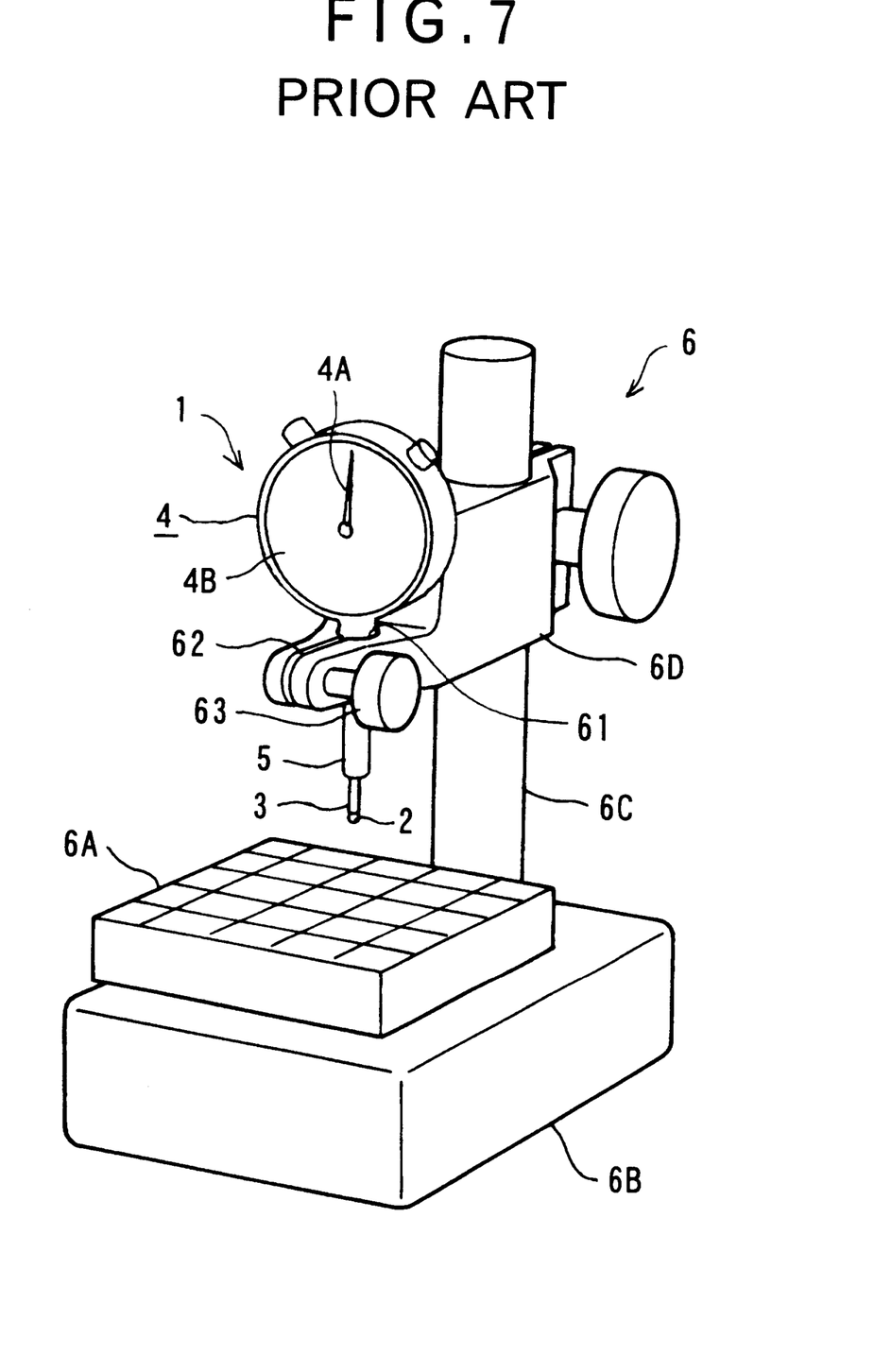
FIG. 7 is an entire perspective view showing a conventional dial gauge and a supporting stand.
Figure 8:
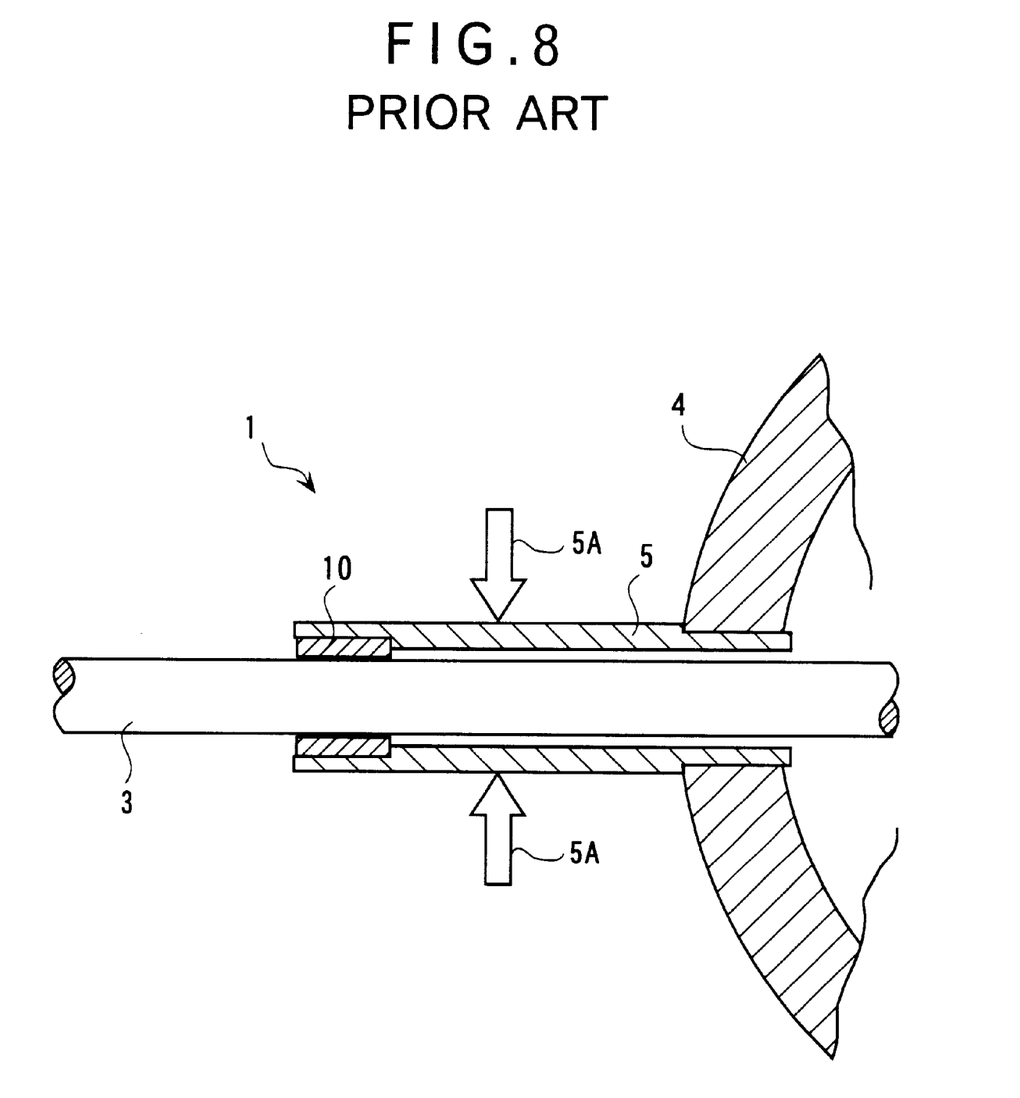
FIG. 8 is an enlarged cross section showing a primary portion of the conventional dial gauge.

A dial gauge 1 shown in FIGS. 7 and 8 is known as a measuring instrument for measuring a dimension of a workpiece.

The dial gauge 1 has a spindle 3 having a probe 2 to be in contact with the workpiece at a distal end thereof, a body 4 having a display 4B for displaying a measured value by a pointer 4A, and a cylindrical stem 5 provided to the body 4 for slidably holding the spindle 3 through a stem bush 10, the dimension of the workpiece is measured by detecting a displacement of the spindle 3 relative to the body 4. Among the above components, the stem bush 10 is formed in a cylindrical shape having outer circumference being fixed to an inner wall of the stem 5 and inner circumference slidably holding the spindle 3. A predetermined clearance is formed between the inner circumference of the stem bush 10 and the outer circumference of the spindle 3. The stem bush 10 is located on the probe 2 side of the stem 5.

The dial gauge 1 sometimes is used to measure the workpiece while being mounted to a supporting stand 6 as shown in FIG. 7.

The supporting stand 6 has a base 6B having a measuring table 6A on an upper surface thereof, a column 6C standing of the base 6B, and a bracket 6D vertically movable along the column 6C with the dial gauge 1 held thereon. The bracket 6D has a clamp hole 61 for the stem 5 of the dial gauge 1 to be inserted, a slitting groove 62 extending from the clamp hole 61 to an end (an end remote from the column 6C) of the bracket 6D, and a clamp screw 63 for elastically deforming the end of the bracket 6D to narrow the width of the slitting groove 62.

In use, after the stem 5 of the dial gauge 1 is inserted to the holding hole 61 of the bracket 6D, the dial gauge 1 is fixed to the bracket 6D by clamping the clamp screw 63. At this time, a clamp position 5A (outline arrow in FIG. 8) of the stem 5 by the clamp screw 63 is remote from the stem bush 10 by a predetermined distance along an axial direction of the spindle 3. In this state, after the spindle 3 of the dial gauge 1 is once lifted, the workpiece is set on the measuring table 6A. Subsequently, the spindle 3 is lowered so that the probe 2 abuts the workpiece. The height of the workpiece is measured by reading the dial gauge at the time.

However, since the above-described dial gauge 1 is mounted to the bracket 6D of the supporting stand 6 by clamping the stem 5 with the clamp screw 63, the stem 5 can be slightly deformed on account of the clamp force of the clamp screw 63 for clamping the stem 5. When the stem 5 is deformed, the stem bush 10 fitted to the inner wall of the stem 5 also deforms. The deformation of the stem bush 10 can bring the inner circumference of the stem bush 10 into contact with the outer circumference of the spindle 3, so that the inner circumference of the stem bush 10 holds the outer circumference of the spindle 3, thus deteriorating slidability of the spindle 3.

In order to overcome the above disadvantage, the clearance between the spindle 3 and the stem bush 10 may be set wide. However, when the clearance is enlarged, shaky movement of the spindle 3 relative to the stem bush 10 can be magnified, so that the measurement accuracy can be deteriorated.

SUMMARY OF THE INVENTION

According to an aspect of the present invention, a dial gauge includes: a spindle having a probe to be in contact with a workpiece at a distal end thereof; a body; and a stem provided to the body for slidably holding the spindle through a stem bush, the stem bush having: a fitting fitted to an inner wall of the stem while securing a predetermined clearance against the spindle; a holder for slidably holding the spindle, and having a predetermined clearance against the inner wall of the stem; and an elastically deformable connector for connecting the fitting and the holder, the clearance between the fitting and the spindle being larger than the clearance between the holder and the spindle.

When the dial gauge is mounted to the supporting stand by clamping the stem, the stem can be deformed by the clamping force. Since the clearance between the fitting and the spindle is set large in the stem bush, the inner circumference of the fitting is not in contact with the outer circumference of the spindle even when the fitting secured to the inner wall of the stem is deformed in accordance with deformation of the stem. On the other hand, since the clearance between the stem and the holder is large, the inner wall of the deformed stem is not in contact with the outer circumference of the holder. In other words, the inner circumference of the holder is not pressed against the outer circumference of the spindle by the stem.

Further, since the fitting and the holder of the stem bush is connected by the elastically deformable connector, even when the fitting is deformed in accordance with the deformation of the stem, most of the deformation is absorbed by the elastic deformation of the connector, so that the deformation of the fitting is not directly transferred to the holder, thus minimizing the deformation of the holder. In other words, deterioration of slidability of the spindle relative to the stem bush can be minimized. Accordingly, even when the stem is deformed in fixing the dial gauge to the supporting stand, the deterioration of slidability of the spindle relative to the stem bush can be prevented.

Further, since the deformation of the holder in accordance with deformation of the stem is smaller than the conventional arrangement, the clearance between the holder and the spindle can be made smaller than the conventional arrangement without influencing on the slidability of the spindle. Accordingly, the shaky movement of the spindle and the holder can be made smaller than the conventional arrangement, thus improving the measurement accuracy.

In an arrangement of the present invention, the fitting may preferably be formed in a cylinder, and the holder may preferably be formed in a cylinder having a diameter corresponding to a diameter of the spindle.

Accordingly, since the fitting is cylindrically formed, bonding area of the fitting against the inner wall of the stem can be enlarged, thus securely fixing the fitting to the inner wall of the stem. Further, since the holder is cylindrical, the slide movement of the spindle in axial direction can be stabilized.

In an arrangement of the present invention, the fitting and the holder may preferably be spaced apart along an axial direction of the spindle, and the connector may preferably be a tapered cylinder connecting the fitting and the holder, one end of the connector having a diameter corresponding to the diameter of the fitting and the other end of the connector having a diameter corresponding to the diameter of the holder.

Accordingly, since the fitting and the holder are connected by the cylindrical connector having diameters of both ends corresponding to the diameter of the fitting and the holder respectively, the fitting can be strongly connected to the holder.

In the above arrangement, the holder may preferably located in the cylinder of the fitting, and the connector may preferably connect mutually adjacent ones of ends of the fitting and the holder, the thickness of the connector being smaller than the respective thickness of the fitting and the holder.

Accordingly, since the holder is provided in the cylinder of the fitting, the stem bush of the present invention can be used to a stem of short length. Further, since the thickness of the connector is smaller than respective thickness of the fitting and the holder, the connector is more easily deformed than the fitting and the holder, thus more effectively absorbing the deformation of the fitting by the connector.

In an arrangement of the present invention, the fitting and the holder may preferably be spaced apart along an axial direction of the spindle, and the connector may preferably connect a part of mutually opposing ends of the fitting and the holder, the connector being thinner than the respective cylinders of the fitting and the holder.

Accordingly, since a part of mutually opposing ends of the fitting and the holder is connected by the connector, the size of connecting portion of the fitting and the holder can be reduced, thus reducing transmission of the deformation of the fitting toward the holder. Further, since the connector is thinner than the fitting and the holder, the connector is more easily deformed than the fitting and the holder, thus more effectively absorbing the deformation of the fitting by the connector.

DETAILED DESCRIPTION OF PREFERRED EMBODIMENT(S)

Preferred embodiments of the present invention will be described below with reference to attached drawings.

First Embodiment

Figure 1:
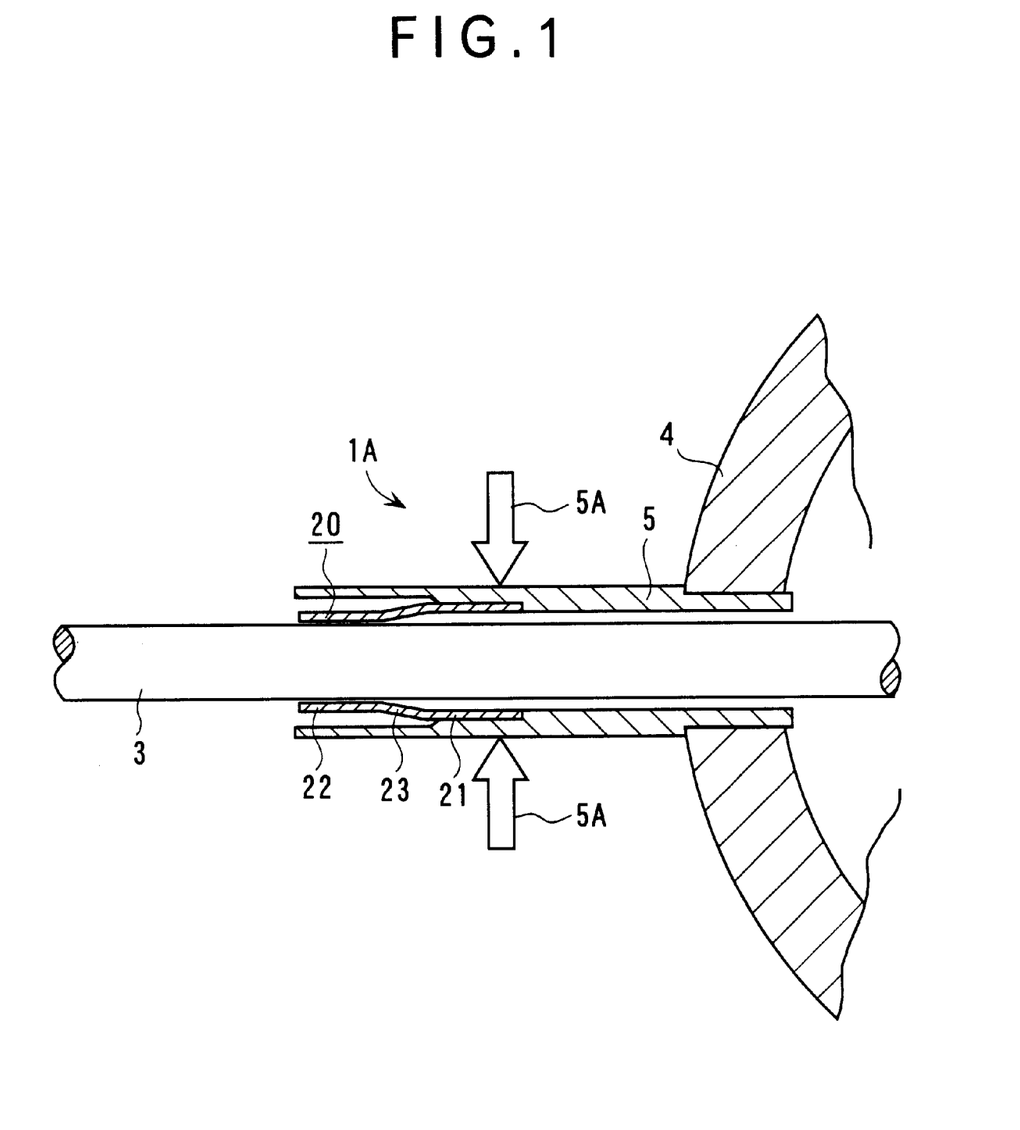
FIG. 1 is a cross section showing a primary portion of a dial gauge according to first embodiment of the present invention.

FIG. 1 shows a dial gauge 1A of the first embodiment of the present invention. As in the conventional dial gauge 1, the dial gauge 1A has a spindle 3 having a probe (not shown) to be in contact with the workpiece at a distal end thereof, a body 4 having a display (not shown) for displaying a measured value by a pointer, and a stem 5 provided to the body 4 for slidably holding the spindle 3 through a stem bush 20, where a dimension of the workpiece is measured by detecting a displacement of the spindle 3 relative to the body 4.

Figure 2:
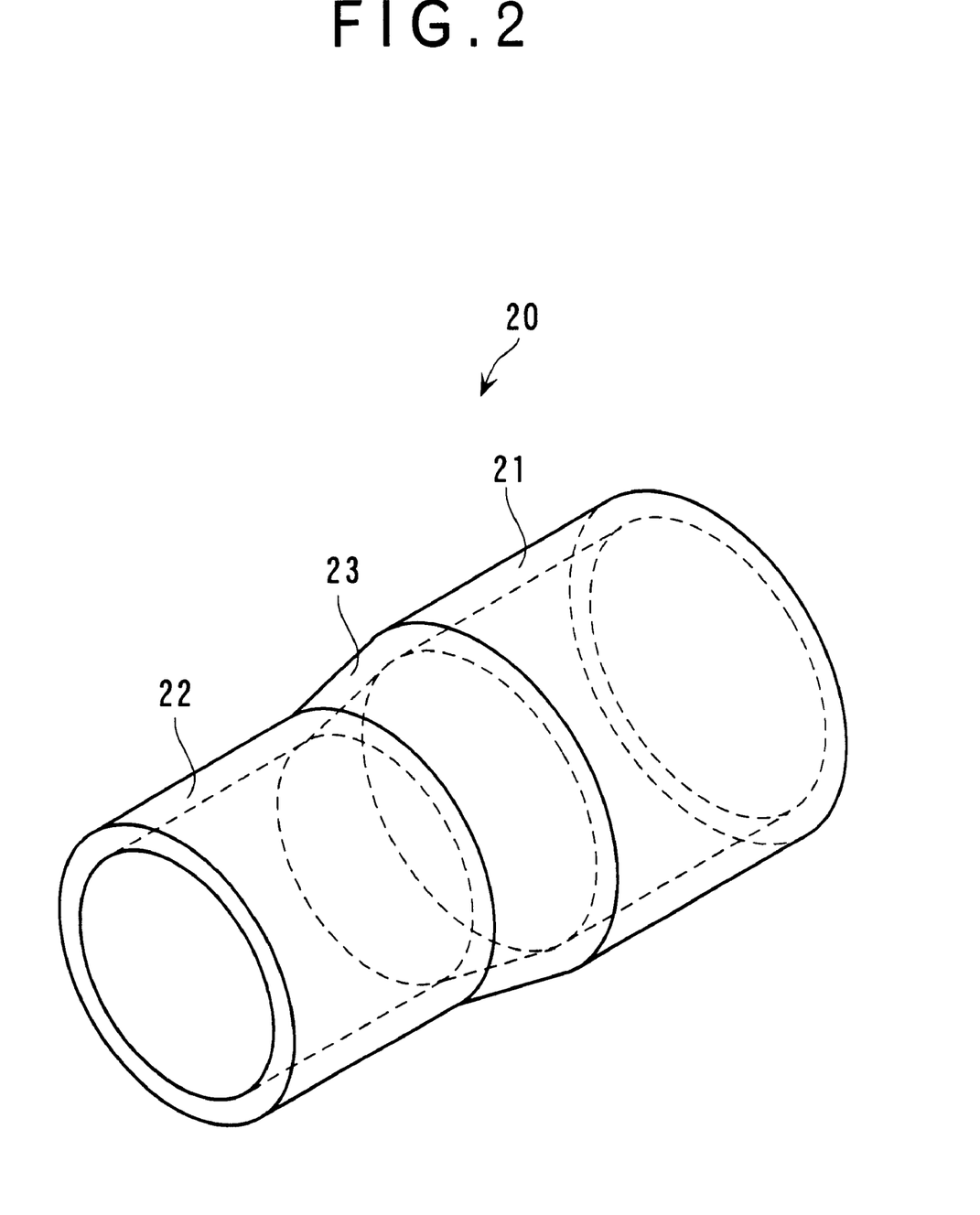
FIG. 2 is an enlarged perspective view showing a stem bush of the aforesaid first embodiment.

As shown in FIG. 2, the stem bush 20 has a fitting 21 fitted to an inner wall of the stem 5 and securing a predetermined clearance against the spindle 3, a holder 22 for slidably holding the spindle 3, the holder 22 securing a predetermined clearance against the inner wall of the stem 5, and an elastically deformable connector 23 for connecting the fitting 21 and the holder 22. The fitting 21, the connector 23 and the holder 22 are sequentially disposed along an axial direction of the spindle 3. The stem bush 20 is located on the probe side of the stem 5.

The fitting 21 is a cylinder with an outer circumference thereof fitted to the inner wall of the stem 5. The holder 22 is a cylinder having an inner diameter corresponding to the outer diameter of the spindle 3, where a predetermined clearance is secured between the inner circumference of the holder 22 and the outer circumference of the spindle 3.

The connector 23 is a cylinder having trapezoidal side face with one end thereof (an end on the right side of FIG. 2) corresponding to the diameter of the fitting 21 and the other end (an end on the left side in FIG. 2) corresponding to the diameter of the holder 22, thus connecting the fitting 21 and the holder 22.

The clearance between the fitting 21 and the spindle 3 and the clearance between the holder 22 and the stem 5 are larger than the clearance between the holder 22 and the spindle 3.

Next, a function of the present invention will be described below.

The dimension of the workpiece is measured using the dial gauge 1A while the dial gauge 1A is mounted to the conventional supporting stand 6 (see FIG. 7). In order to mount the dial gauge 1A to the supporting stand 6, as described above, after the stem 5 of the dial gauge 1A is inserted to the clamp hole 61 of the bracket 6D, the clamp screw 63 is clamped to fix the dial gauge 1A to the bracket 6D. In this condition, the clamp position 5A (outline arrow in FIG. 1) is located at predetermined distance away from the stem bush 10 along the axial direction of the spindle 3.

When the clamp screw 63 is clamped, simultaneously with deforming the stem 5 by the clamp force, the fitting 21 fitted to the inner wall of the stem 5 is also deformed. Since a predetermined clearance is formed between the fitting 21 and the spindle 3, the fitting 21 does not abut the spindle 3.

Since the predetermined clearance is secured between the stem 5 and the holder 22, the stem 5 does not directly touch the holder 22 even when the stem 5 is deformed, so that the deformation of the holder 22 is not deformed on account of the contact of the stem 5 against the holder 22. Further, since large part of the deformation of the fitting 21 in accordance with the deformation of the stem 5 is absorbed by the elastic deformation of the connector 23, the influence on the holder 22 by the deformation of the fitting 21 is reduced.

Accordingly, even when the stem 5 is fixed to the bracket 6D of the supporting stand 6, the deformation of the holder can be minimized, so that the slidability of the spindle 3 can be maintained at substantially the same level as before being fixed to the bracket 6D.

While the dial gauge 1A is mounted to the supporting stand 6, the workpiece is set on the measuring table 6A after the spindle 3 of the dial gauge 1A is once raised. Subsequently, the spindle 3 is lowered to bring the probe 2 into contact with the workpiece. The height dimension of the workpiece is measured by reading the dial gauge at the time.

According to the above-described embodiment, following effects can be obtained.

(1) When the dial gauge 1A is mounted to the supporting stand 6 by clamping the stem 5, the stem 5 can be deformed by the clamping force. Since the clearance between the fitting 21 and the spindle 3 is set large in the stem bush 20, the inner circumference of the fitting 21 is not in contact with the outer circumference of the spindle 3 even when the fitting 21 secured to the inner wall of the stem 5 is deformed in accordance with deformation of the stem 5. On the other hand, since the clearance between the stem 5 and the holder 22 is large, the inner wall of the deformed stem 5 is not in contact with the outer circumference of the holder 22. In other words, the inner circumference of the holder 22 is not pressed against the outer circumference of the spindle 3 by the stem 5.

Further, since the fitting 21 and the holder 22 of the stem bush 2 is connected by the elastically deformable connector 23, even when the fitting 21 is deformed in accordance with the deformation of the stem 5, most of the deformation is absorbed by the elastic deformation of the connector 23, so that the deformation of the fitting 21 is not directly transferred to the holder 22, thus minimizing the deformation of the holder 22. In other words, deterioration of slidability of the spindle 3 relative to the stem bush 20 can be minimized. Accordingly, even when the stem 5 is deformed in fixing the dial gauge 1A to the supporting stand 6, the deterioration of slidability of the spindle 3 relative to the stem bush 20 can be prevented.

Further, since the deformation of the holder 22 in accordance with deformation of the stem 5 is smaller than the conventional arrangement, the clearance between the holder 22 and the spindle 3 can be made smaller than the conventional arrangement without influencing on the slidability of the spindle 3. Accordingly, the shaky movement of the spindle 3 and the holder 22 can be made smaller than the conventional arrangement, thus improving the measurement accuracy.

(2) Since the fitting 21 is cylindrically formed in the stem bush 20, bonding area of the fitting 21 against the inner wall of the stem 5 can be enlarged, thus securely fixing the fitting 21 to the inner wall of the stem 5. Further, since the holder 22 is cylindrical, the slide movement of the spindle 3 in axial direction can be stabilized.

(3) Since the fitting 21 and the holder 22 of the stem bush 20 is connected by the cylindrical connector 23 having both ends diameters respectively corresponding to the diameter of the fitting 21 and the holder 22, the fitting 21 can be strongly connected to the holder 22.

Second Embodiment

Figure 3:
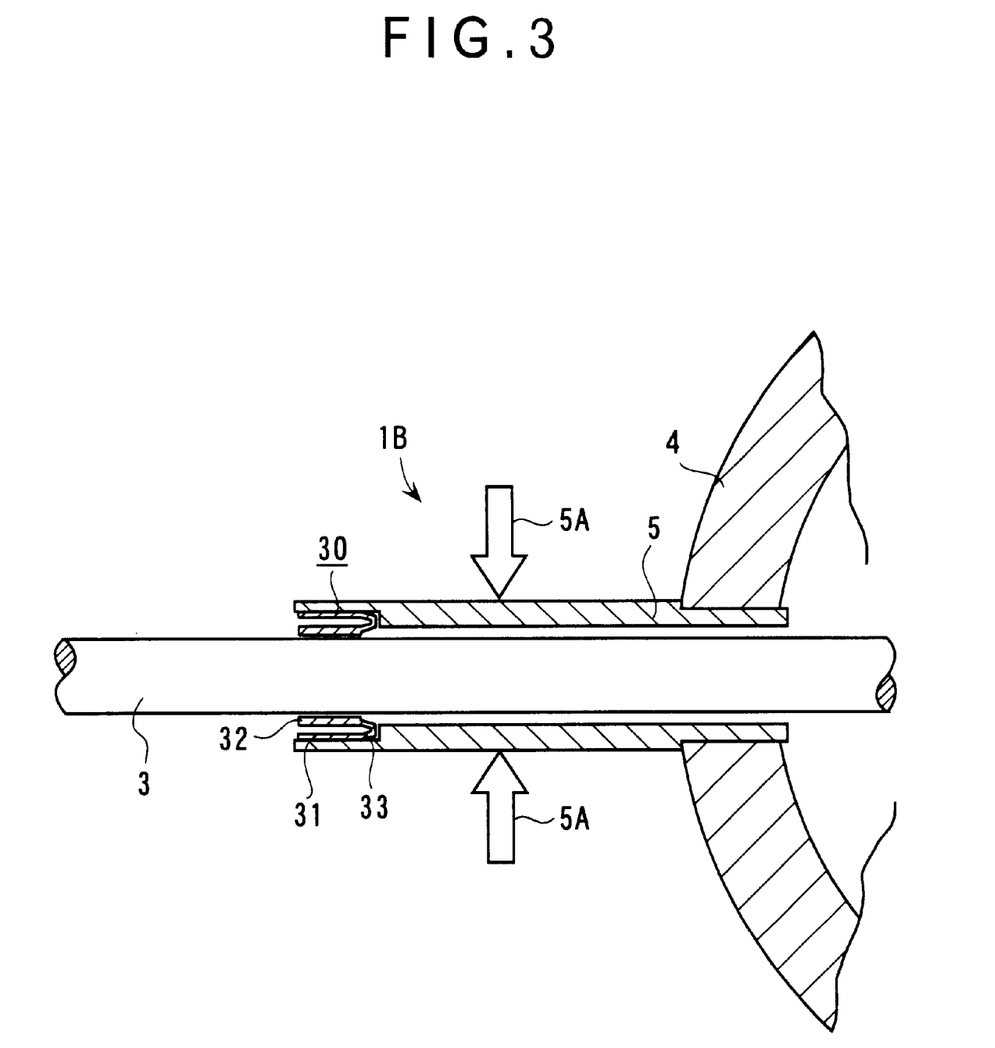
FIG. 3 is a cross section showing a primary portion of a dial gauge according to second embodiment of the present invention.

FIG. 3 shows a dial gauge 1B of the second embodiment of the present invention. Since the present embodiment differs from the above-described first embodiment only in the shape of the stem bush and the other arrangement and functions are the same, the same component will be applied with the same reference numeral to omit or simplify the description thereof.

Figure 4:
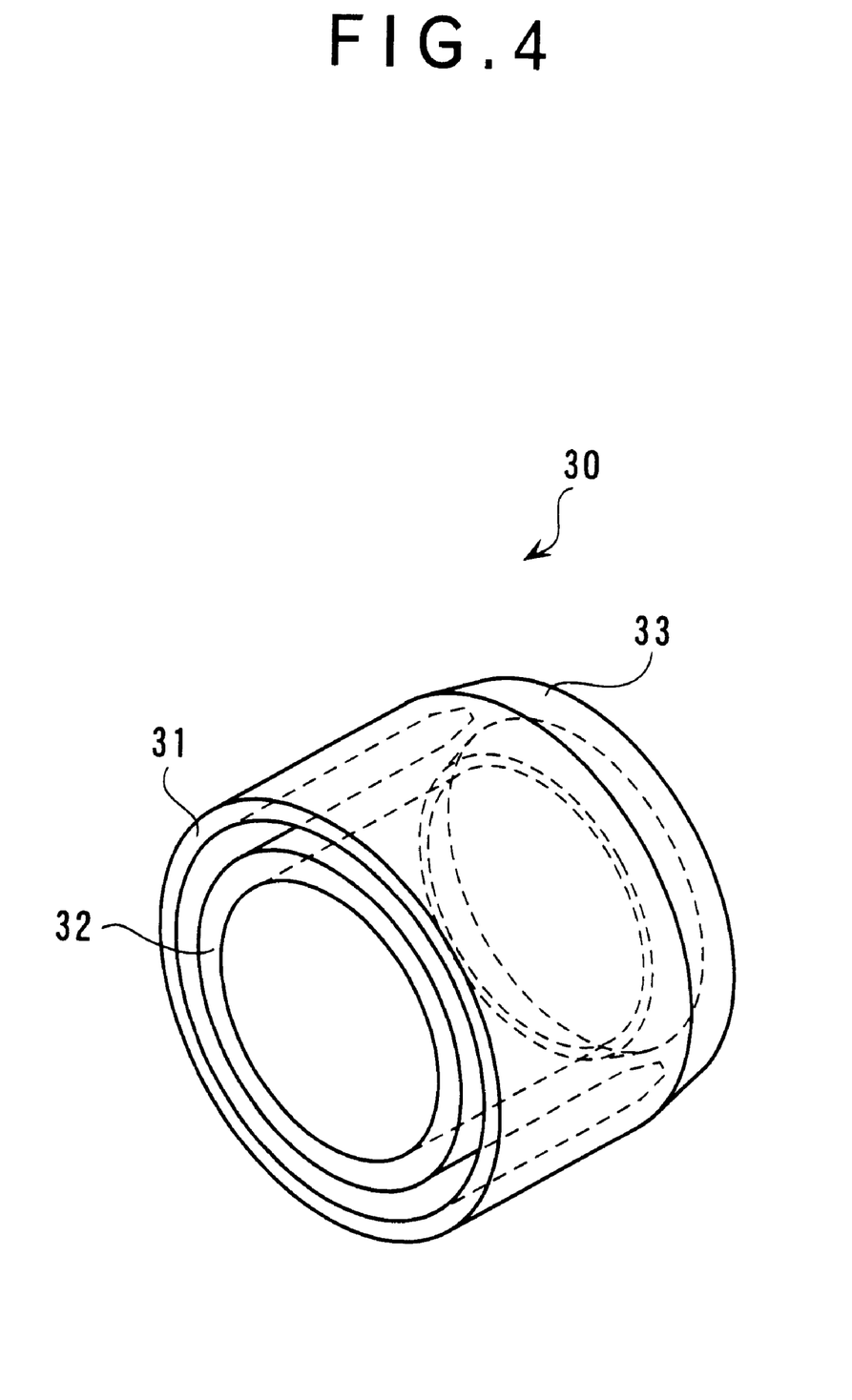
FIG. 4 is an enlarged perspective view showing a stem bush of the aforesaid second embodiment.

As shown in FIG. 4, the stem bush 30 has a fitting 31 fixed to an inner wall of the stem 5 and having a predetermined clearance between the spindle 3, a holder 32 for slidably holding the spindle 3, the holder 32 securing a predetermined clearance against the inner wall of the stem 5, and an elastically deformable connector 33 for connecting the fitting 31 and the holder 32.

The fitting 31 is cylindrically formed with an outer circumference thereof fitted to the inner wall of the stem 5. The holder 32 is a cylinder having an inner diameter corresponding to the outer diameter of the spindle 3, where a predetermined clearance is formed between the inner circumference of the holder 32 and the outer circumference of the spindle 3. The holder 32 is located inside the cylinder of the fitting 31, so that a predetermined clearance is secured between the inner circumference of the fitting 31 and the outer circumference of the holder 32.

The connector 33 connects mutually adjacent ones of ends of the fitting 31 (an end on the right side of FIG. 4) and the holder 32 (an end on the right side in FIG. 4), where the thickness of the connector 33 is smaller than respective thickness of the fitting 31 and the holder 32.

The clearance between the fitting 31 and the holder 32 is larger than the clearance between the holder 32 and the spindle 3.

According to the above-described embodiment, following effect as well as the effects (1) and (2) of the first embodiment can be obtained. (4) Since the holder 32 of the stem bush 30 is provided in the cylinder of the fitting 31, the stem bush 30 of the present invention can be installed to a stem of short length. Further, since the thickness of the connector 33 is smaller than the respective thickness of the fitting 31 and the holder 32, the connector 33 can be deformed more easily than the fitting 31 and the holder 32, so that the deformation of the fitting 31 can be more effectively absorbed by the connector 33.

Third Embodiment

Figure 5:
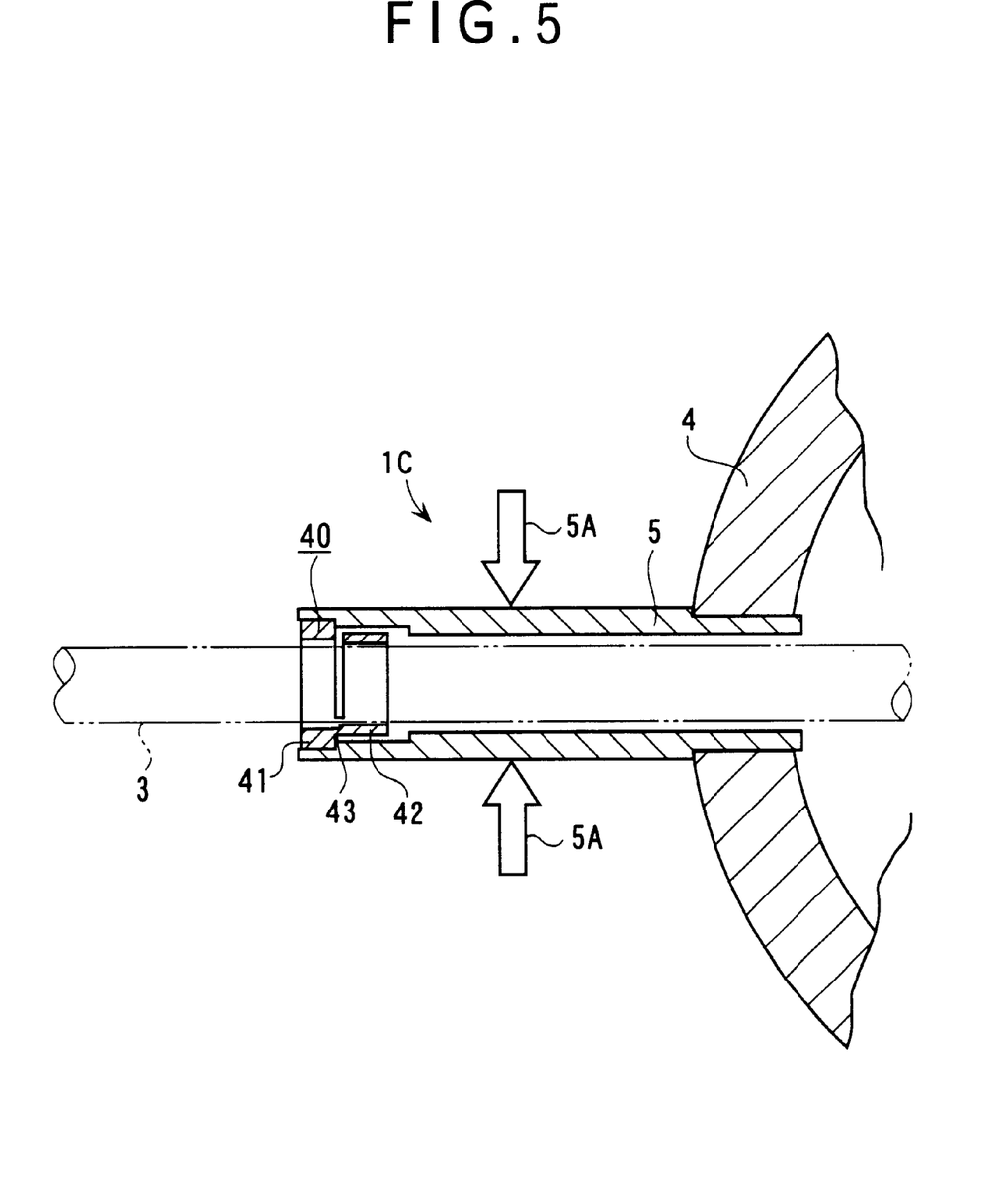
FIG. 5 is a cross section showing a primary portion of a dial gauge according to third embodiment of the present invention.

FIG. 5 shows a dial gauge 1C of the third embodiment of the present invention. Since the present embodiment differs from the above-described first and second embodiments only in the shape of the stem bush and the other arrangement and functions are the same, the same component will be applied with the same reference numeral to omit or simplify the description thereof.

Figure 6:
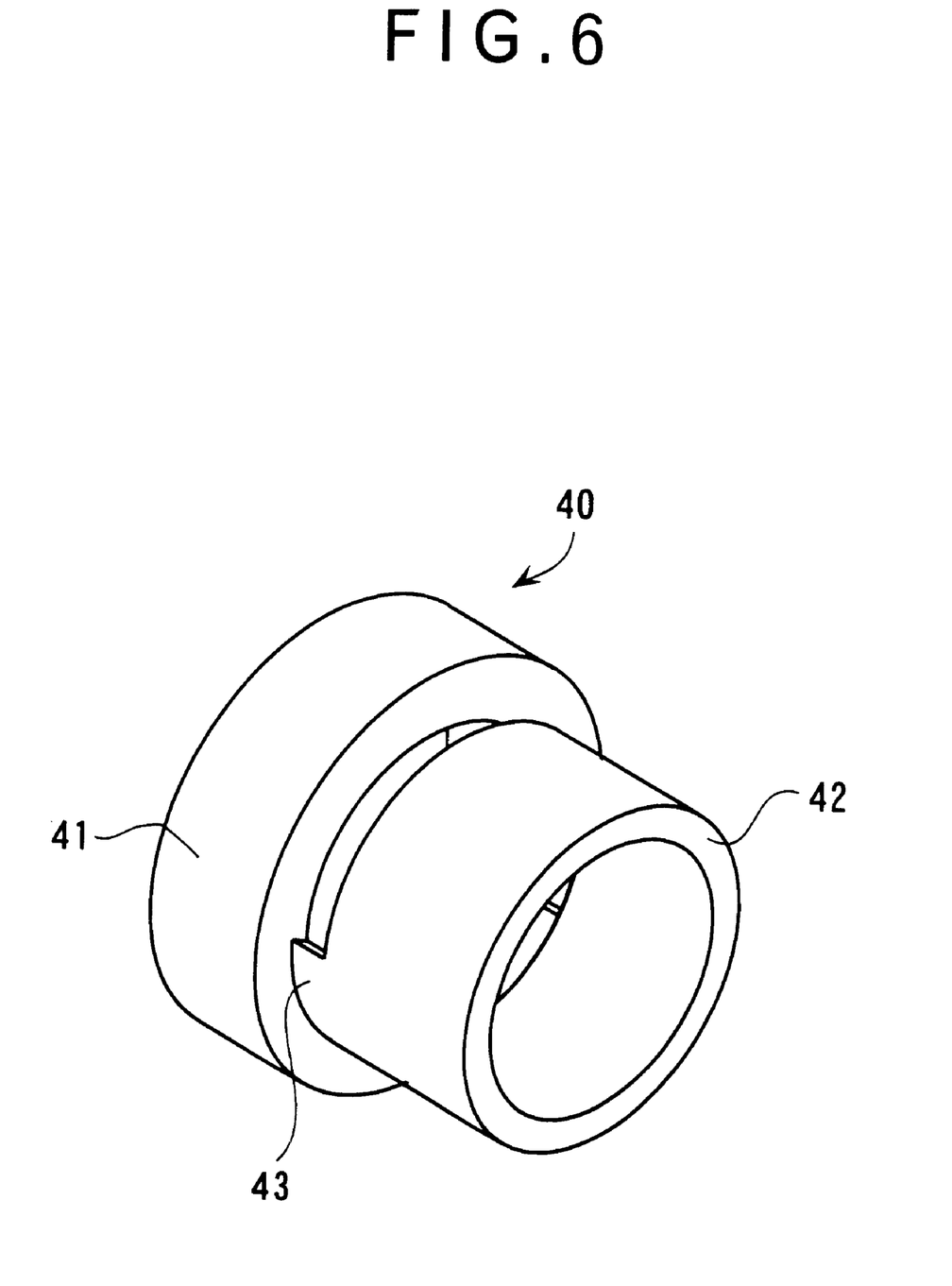
FIG. 6 is an enlarged perspective view showing a stem bush of the aforesaid third embodiment.

As shown in FIG. 6, the stem bush 40 has a fitting 41 fixed to an inner wall of the stem 5 and having a predetermined clearance against the spindle 3, a holder 42 for slidably holding the spindle 3, the holder 42 securing a predetermined clearance against the inner wall of the stem 5, and an elastically deformable connector 43 for connecting the fitting 41 and the holder 42. The fitting 41, the connector 43 and the holder 42 are sequentially arranged along the axial direction of the spindle 3.

The fitting 41 is cylindrically formed with an outer circumference thereof fixed to the inner wall of the stem 5. The holder 42 is a cylinder having an inner diameter corresponding to the outer diameter of the spindle 3, where a predetermined clearance is formed between the inner circumference of the holder 42 and the outer circumference of the spindle 3.

The connector 43 connects parts of mutually opposing ends of the fitting 41 and the holder 42, and the thickness of the connector 43 is thinner than the thickness of the respective cylinders of the fitting 41 and the holder 42. The connector 43 is continuously formed in crescent shape of which both sides extends on an end of the fitting 41 (an end on the right side of FIG. 6) and an end of the holder 42 (an end on the left side in FIG. 6), thus connecting the fitting 41 and the holder 42.

The clearance between the fitting 41 and the holder 42 and the clearance between the holder 42 and the stem 5 are larger than the clearance between the holder 42 and the spindle 3.

According to the above-described embodiment, following effect as well as the effects (1) and (2) of the first embodiment can be obtained. (5) Since a part of the mutually opposing ends of the fitting 41 and the holder 42 of the stem bush 40 is connected by the connector 43, the size of the connecting portion between the fitting 41 and the holder 42 can be reduced, so that the deformation of the fitting 41 is less likely to be transferred to the holder 42. Further, since the thickness of the connector 43 is thinner than the thickness of the fitting 41 and the holder 42, the connector 43 can be more easily deformed by the fitting 41 and the holder 42, so that the deformation of the fitting 41 can be more effectively absorbed by the connector 43.

Modifications

Incidentally, the scope of the present invention is not restricted to the above-described embodiment, but includes modifications and improvements as long as an object of the present invention can be achieved.

For instance, though a display for displaying measured value by a pointer is provided to the body 4 of the dial gauges 1A, 1B and 1C, the display may electrically indicate the measured value, which is also included in the scope of the present invention.

Though the dial gauges 1A, 1B and 1C are mounted to the supporting stand 6 to measure the workpiece, the dial gauge may be fixed using other supporting stands, or alternatively, the dial gauge may not be mounted to the supporting stand.

What is claimed is:

1. A dial gauge, comprising:
   a spindle having a probe to be in contact with a workpiece at a distal end thereof;
   a body; and
   a stem provided to the body for slidably holding the spindle through a stem bush, wherein the stem bush has: a fitting fitted to an inner wall of the stem while securing a predetermined first clearance relative to the spindle; a holder for slidably holding the spindle, and having a predetermined second clearance relative to the spindle; and an elastically deformable connector for connecting the fitting and the holder, the first clearance between the fitting and the spindle being larger than the second clearance between the holder and the spindle.

2. The dial gauge according to claim 1, wherein the fitting is formed in a cylinder, and wherein the holder is formed in a cylinder having a diameter capable of keeping the second clearance.

3. The dial gauge according to claim 2, wherein the fitting and the holder are spaced apart along an axial direction of the spindle, and wherein the connector is a tapered cylinder connecting the fitting and the holder, one end of the connector having a diameter corresponding to the diameter of the fitting and the other end of the connector having a diameter corresponding to the diameter of the holder.

4. The dial gauge according to claim 2, wherein the holder is located in the cylinder of the fitting, and wherein the connector connects mutually adjacent ones of ends of the fitting and the holder, the thickness of the connector being smaller than the respective thickness of the fitting and the holder.

5. The dial gauge according to claim 2, wherein the fitting and the holder are spaced apart along an axial direction of the spindle, and wherein the connector connects a part of mutually opposing ends of the fitting and the holder, the connector being thinner than the respective cylinders of the fitting and the holder.

\* \* \* \* \*